(12) United States Patent
Nakamura

(10) Patent No.: US 7,301,593 B2
(45) Date of Patent: Nov. 27, 2007

(54) LIQUID CRYSTAL DISPLAY DEVICE

(75) Inventor: Shun Nakamura, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 141 days.

(21) Appl. No.: 10/505,857

(22) PCT Filed: Mar. 17, 2003

(86) PCT No.: PCT/JP03/03169

§ 371 (c)(1), (2), (4) Date: Aug. 27, 2004

(87) PCT Pub. No.: WO03/079106

PCT Pub. Date: Sep. 25, 2003

(65) Prior Publication Data

US 2005/0168669 A1 Aug. 4, 2005

(30) Foreign Application Priority Data

Mar. 18, 2002 (JP) ............................. 2002-074256

(51) Int. Cl.
*G02F 1/1335* (2006.01)
(52) U.S. Cl. .......................... 349/117; 349/98
(58) Field of Classification Search ............... 349/96, 349/102, 117–121
See application file for complete search history.

(56) References Cited

U.S. PATENT DOCUMENTS 5,528,400 A * 6/1996 Arakawa .................... 349/117
6,064,457 A * 5/2000 Aminaka .................... 349/117
6,162,654 A * 12/2000 Kawabe ....................... 438/30
2001/0030723 A1 10/2001 Koma

FOREIGN PATENT DOCUMENTS

| EP | 0926533 A2 | 6/1999 |
|---|---|---|
| EP | 1156349 A1 | 11/2001 |

* cited by examiner

*Primary Examiner*—Michael H. Caley
(74) *Attorney, Agent, or Firm*—Buchanan Ingersoll & Rooney PC

(57) ABSTRACT

The present invention provides a liquid crystal display device that requires a reduced power consumption, which shows improved response speed and improved viewing angle properties, and that can give high-quality image display at low power consumption, and the liquid crystal display device of the present invention comprises a bend orientation mode liquid crystal cell using a low-temperature polysilicon TFT; and two polarizing plates disposed on both sides of the liquid crystal cell respectively, wherein at least one of the two polarizing plates is an elliptically polarizing plate comprising: a transparent protective layer; a polarizing layer; a transparent support; and an optically anisotropic layer comprising a discotic compound, in this order from outside of the liquid crystal cell, an inclination angle between the disc plane of the discotic compound and the transparent support plane is within a range of 25 to 35 degrees on the average, and the optically anisotropic layer has a $Re_1$ retardation value measured in front of the face of 25 to 50 nm.

10 Claims, 6 Drawing Sheets

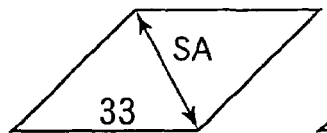 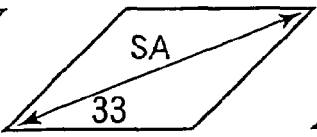 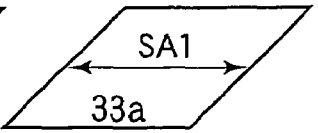
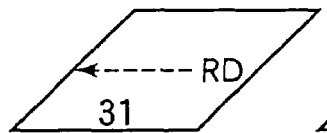 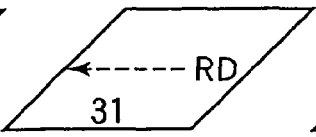 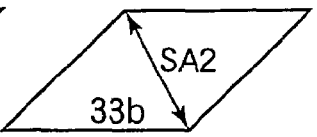
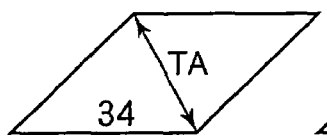 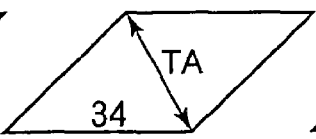 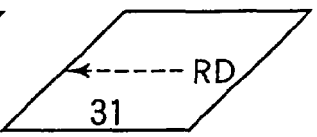
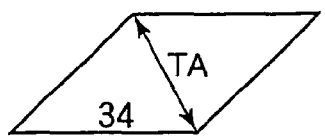
FIG.6
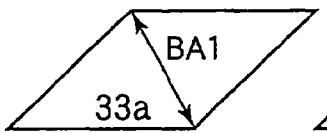 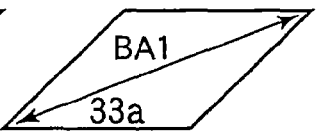
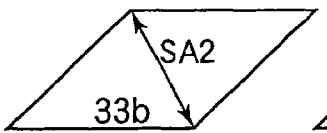 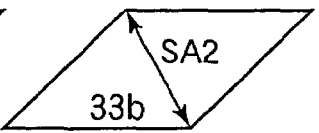
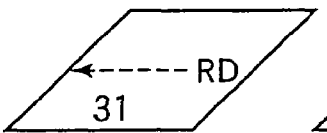 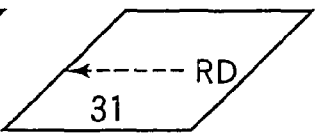
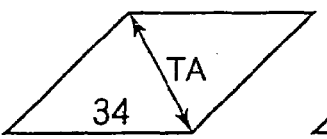 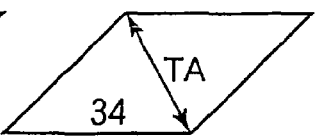

LIQUID CRYSTAL DISPLAY DEVICE

TECHNICAL FIELD

This invention relates to a bend orientation mode liquid crystal display device using a low-temperature polysilicon TFT.

BACKGROUND ART

Liquid crystal display devices (LCD) are much more advantageous than CRT (Cathode Ray Tubes) because of their small thickness, light weight and low power consumption. The liquid crystal display device comprises a liquid crystal cell and a pair of polarizing elements disposed on both sides of the cell respceively. The liquid cell comprises rod-like liquid crystalline molecules, two substrates for encapsulating them, and electrodes for applying a voltage to the rod-like liquid crystalline molecules. In order to orient the encapsulated rod-like liquid crystalline molecules, the two substrates have an orientation membrane.

In order to remove coloration of an image displayed on the liquid crystal cell, an optical compensatory sheet (retardation plate) is often provided between the liquid crystal cell and the polarizing element. A laminate of the polarizing element (polarizing membrane) and the optical compensatory sheet functions as an elliptically polarizing plate. In some cases, a function of enlarging the viewing angle of the liquid crystal cell is imparted to the optical compensatory sheet. As the optical compensatory sheet, stretched birefringent films have conventionally been used.

It has also been proposed to use an optical compensatory sheet comprising a transparent support having provided thereon an optically anisotropic layer containing a discotic compound in place of the stretched birefringent films. The optically anisotropic layer is formed by orienting the discotic compound and fixing the oriented alignment. The discotic compounds generally have a large birefringent index. Also, discotic compounds give various orientation forms. Therefore, by using such discotic compounds, there can be prepared an optical compensatory sheet having optical properties not obtainable by the conventional stretched birefringent films. As to the optical compensatory sheets using the discotic compounds, descriptions are given in the specifications of JP-A-6-214116, U.S. Pat. Nos. 5,583,679 and 5,646,703, and West German Patent 3911620A1.

U.S. Pat. Nos. 4,583,825 and 5,410,422 disclose a liquid crystal display device using a bend orientation mode liquid crystal cell wherein rod-like liquid crystalline molecules located in the upper portion of the liquid crystal cell and those located in the lower portion of the liquid crystal cell are oriented substantially in reverse directions (symmetrically). Since the rod-like liquid crystalline molecules in the upper portion and those in the lower portion are symmetrically oriented with each other, the bend orientation mode liquid crystal cell has a function of self optical compensation. Therefore, this liquid crystal mode is also called OCB (Optically Compensatory Bend) liquid crystal mode. The bend orientation mode liquid crystal display device has the advantage of a high response speed.

In comparison with the general liquid crystal modes (TN mode, STN mode), the bend orientation mode has the advantage of a wider viewing angle and a faster response speed. In comparison with CRT, however, it must be more improved. In order to more improve the bend orientation mode liquid crystal display device, it may be considered to use an optical compensatory sheet similarly to the general liquid modes. However, an optical compensatory sheet composed of a conventional stretched birefringent film shows only an insufficient optically compensating function in the bend orientation mode liquid crystal display device.

As has been described hereinbefore, it has been proposed to use, in place of the stretched birefringent film, an optical compensatory sheet having an optically anisotropic layer containing a discotic compound and a transparent support. JP-A-9-197397 (U.S. Pat. No. 5,805,253) and International Patent Publication WO96/37804 (European Patent 0783128A) disclose a bend orientation mode liquid crystal display device using an optical compensatory sheet containing the discotic compound. By using the optical compensatory sheet containing the discotic compound, a viewing angle of the bend orientation mode liquid crystal display device is markedly improved.

Further, JP-A-11-316378 describes that examination of the use of an optical compensatory sheet containing a discotic compound in the bend orientation mode liquid crystal display device revealed the problem that a light of a particular wavelength is leaked to cause coloration on a displayed image. It describes that the cause of this coloration lies in wavelength dependency of the transmission of an elliptically polarizing plate (a laminate of the polarizing element and the optical compensatory sheet).

And, in this publication, an excellent optical compensation effect is obtained by disposing an optically anisotropic layer and a polarizing membrane so that the angle between the average direction of orthogonal projection of the normal lines of disc plane of the discotic compound to the transparent support plane and the in-plane transparent axis of the polarizing membrane becomes substantially 45°.

On the other hand, a liquid crystal display device using a low-temperature polysilicon TFT has been known to permit high-speed charging and realize an increased opening ratio.

However, in the case where such low-temperature polysilicon TFT is used in the above-mentioned bend orientation mode liquid crystal cell, the conventional optical compensation film fails to attain a sufficient improvement of a viewing angle when it is intended to improve the viewing angle by the optical compensatory film. Thus, there has been a demand for a liquid crystal display device which can meat requirements for low electric power to consume, high response speed and wide viewing angle.

DISCLOSURE OF THE INVENTION

An object of the invention is to obtain a liquid crystal display device which can reduce necessary electric power, increase response speed and improve viewing angle properties, and which enables to display a high-quality image at a low electric power consumption.

The object of the invention is attained by the following means.

(1) A liquid crystal display device comprising:
  a bend orientation mode liquid crystal cell using a low-temperature polysilicon TFT; and
  two polarizing plates disposed on both sides of the liquid crystal cell respectively,
  wherein at least one of the two polarizing plates is an elliptically polarizing plate comprising: a transparent protective layer; a polarizing layer; a transparent support; and an optically anisotropic layer comprising a discotic compound, in this order from outside of the liquid crystal cell, an inclination angle between the disc plane of the discotic compound and the transparent support plane is within a range of 25 to 35 degrees on the average, and the optically anisotropic layer has a $Re_1$ retardation value measured in front of the face of 25 to 50 nm.

(2) The liquid crystal display device as described in the item (1), wherein the liquid crystal display device is a normally white mode liquid crystal display device, in which a voltage to be applied in black display of the liquid crystal display device is within a range of from 3.5 to 5.0 V.

(3) The liquid crystal display device as described in the item (1) or (2), wherein the optically anisotropic layer, the transparent support and the polarizing layer are disposed so that the angle between the average direction of orthogonal projections of the normal lines to disc plane of the discotic compound to the transparent support plane and the in-plane slow axis of the transparent support is substantially 45°, and the in-plane slow axis of the transparent support is substantially parallel or substantially vertical to the in-plane transparent axis of the polarizing layer.

(4) The liquid crystal display device as described in any one of the items (1) to (3), wherein the transparent support has: a $Re_2$ retardation value defined by the formula (I) below of 0 to 100 nm; and a $Rth_2$ retardation value defined by the formula (II) below of 10 to 1000 nm:

$$Re_2 = (nx_2 - ny_2) \times d_2 \quad (I)$$

$$Rth_2 = [(nx_2 + ny_2)/2 - nz_2] \times d_2 \quad (II)$$

wherein $nx_2$ represents a refractive index along the slow axis in-plane of the transparent support, $ny_2$ represents a refractive index along the fast axis in-plane of the transparent support, $nz_2$ represents a refractive index in the depthwise direction of the transparent support, and $d_2$ represents a thickness of the transparent support.

(5) The liquid crystal display device as described in the item (1), wherein the optically anisotropic layer has the $Re_1$ retardation value measured in front of the face of 28 to 48 nm.

(6) The liquid crystal display device as described in the item (1), wherein the inclination angle between the disc plane of the discotic compound and the transparent support plane is within a range of 30 to 35 degrees on the average.

(7) The liquid crystal display device as described in the item (1), wherein the discotic compound is oriented and fixed in the optically anisotropic layer while maintaining the compound in the oriented state.

(8) The liquid crystal display device as described in the item (7), wherein the discotic compound is fixed in the optically anisotropic layer by a polymerization reaction.

(9) The liquid crystal display device as described in the item (4), wherein the transparent support has the $Re_2$ retardation value defined by the formula (I) of 17 to 70 nm.

(10) The liquid crystal display device as described in the item (4), wherein the transparent support has the $Rth_2$ retardation value defined by the formula (II) of 70 to 300 nm.

(11) The liquid crystal display device as described in the item (1), wherein the transparent support includes a cellulose ester film.

Additionally, in this specification, The term "substantially vertical", "substantially parallel" or "substantially 45°" means within less than ±50 from the strict angle value. This range is preferably less than ±4°, more preferably less than ±3°, most preferably less than ±2°.

In order to attain a high-speed response, a wide viewing angle, and a low power consumption, the inventor has succeeded in making an improvement by combining a bend orientation mode liquid crystal cell using a low-temperature polysilicon TFT and a specific elliptically polarizing plate. As to reduction in power consumption, a driving voltage can be reduced by adjusting $Re_1$ retardation value measured in front of the face of the optically anisotropic layer in the elliptically polarizing plate. The Re retardation value must be within the range of from 25 to 50 nm. When the $Re_1$ retardation value is less than 25 nm, it is difficult to reduce the driving voltage whereas, when more than 50 nm, the viewing angle properties are deteriorated.

Also, a wide viewing angle can be attained by constituting the optically anisotropic layer by the discotic compound and controlling the average inclination angle of the disc plane of discotic compound within a range of from 25 to 35°.

The average inclination angle is an average value of the angle of the disc plane of the alignment layer side and air side. (1) The incident angle dependence of the $Re_1$ retardation value is measured with an ellipsometer. (2) It is assumed that the inclination angle of the discotic compound gradually varied in the thickness direction (the alignment layer side is signed β1 and the air side is β2). (3) The incident angle dependence of the retardation value is calculated by the Jones-matrix method (LCD master by SINTEC K.K.). The value of (1) and (3) are fitted by the method of least squares. The average inclination angle was calculated by the average value of β1 and β2.

The response speed and the viewing angle properties can be improved by combining the bend orientation mode liquid crystal cell and the elliptically polarizing plate. It has been difficult with high-speed liquid crystal modes such as IPS to realize a high-speed response and a high increase in number of pixels at high levels since to increase the number of pixels causes reduction in opening ratio of the liquid crystal cell, resulting in serious reduction in luminance. However, the bend orientation mode gives a higher opening ratio than IPS, and hence it is a liquid crystal mode easily made adapted for increasing the number of pixels. Further, it can permit a high-speed charging and, therefore, when combined with a low-temperature polysilicon TFT which can realize a high opening ratio, it can realize a high-speed response and a high increase in number of pixels at high levels.

BRIEF DESCRIPTION OF THE DRAWINGS

FIG. 6 is a schematic view showing other various embodiments of the elliptically polarizing plate.

DESCRIPTION OF REFERENCE NUMERALS AND SIGNS

Figure 1:
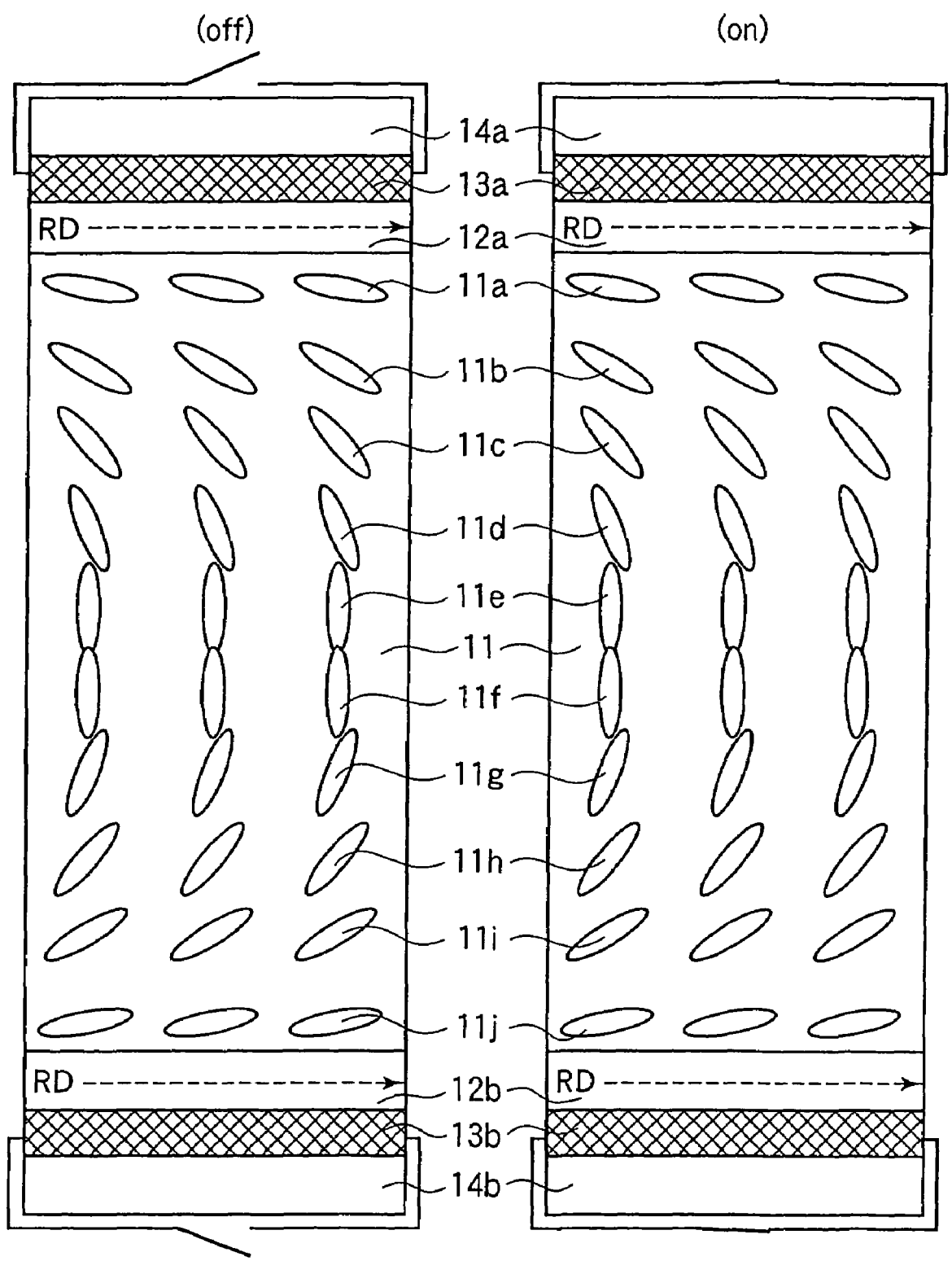
FIG. 1 is a cross-sectional view schematically showing orientation of a liquid crystalline compound within a bend orientation liquid crystal cell.

10 Bend orientation liquid crystal cell
20 Horizontally oriented liquid crystal cell
11, 12 Liquid crystalline compound
11a to 11j, 21a to 21j Rod-like liquid crystalline molecules
2a, 12b, 22a, 22b Orientation membrane
13a, 13b, 23a, 23b Electrode layer
14a, 24a Upper substrate
14b, 24b Lower substrate
31 Optically anisotropic layer
31a to 31e Discotic compound
32 Orientation membrane
33 Transparent support
34 Polarizing membrane
NL Normal of the disc plane of the discotic compound
PL Direction of orthogonally projected normal line of the disc plane to the transparent support plane
RD, RD1 to RD4 Rubbing direction
SA, SA1, SA2 In-plane slow axis
TA In-plane transmission axis
BL Backlight
a to h Relationship of compensation

BEST MODE OF CARRYING OUT THE INVENTION

First, the liquid crystal display device and the elliptically polarizing plate are described by reference to attached drawings.

FIG. 1 is a cross-sectional view schematically showing orientation of a liquid crystal compound within the bend orientation liquid crystal cell.

As is shown in FIG. 1, the bend orientation liquid crystal cell has a structure wherein a liquid crystal compound (11) is encapsulated between an upper substrate (14a) and a lower substrate (14b). The liquid crystal compound (11) to be used in the bend orientation liquid crystal cell generally has a positive dielectric constant anisotropy. The upper substrate (14a) and the lower substrate (14b) of the liquid crystal cell have orientation membranes (12a, 12b) and electrode layers (13a, 13b), respectively. The orientation membrane has a function of orienting rod-like liquid crystalline molecules (11a to 11j). RD represents a rubbing direction of the orientation membrane. The electrode layer has a function of applying a voltage to rod-like liquid crystal molecules (11a to 11j).

When the voltage applied to the bend orientation liquid crystal cell is low, the rod-like liquid crystalline molecules (11a to 11e) on the upper substrate (14a) side of the liquid crystal cell and the rod-like liquid crystalline molecules (11f to 11j) on the lower substrate (14b) side are oriented substantially in reverse directions to each other (vertically symmetrically) as shown in FIG. 1 (off). Also, the rod-like molecules (11a, 11b, 11i, 11j) in the vicinity of the substrates (14a, 14b) are oriented almost in the almost horizontal direction, while the rod-like molecules (11d to 11g) in the central portion of the liquid crystal cell are oriented in the almost vertical direction.

As is shown in FIG. 1 (on), when the applied voltage is high, the rod-like liquid crystalline molecules (11a, 11j) in the vicinity of the substrates (14a, 14b) remain in the almost horizontally oriented state. Also, the rod-like liquid crystalline molecules (11e, 11f) in the central portion of the liquid crystal cell remain in the almost vertically oriented state. It is the rod-like liquid crystalline molecules (11b, 11c, 11d, 11g, 11h, 11i) located in the intermediate positions between each of the substrate and the liquid crystal central portion that undergo change in orientation upon the voltage being increased. They are oriented more vertically than in the "off" state. However, it is the same as with the "off" state that the rod-like liquid crystalline molecules (11a to 11e) on the upper substrate (14a) side of the liquid crystal cell and the rod-like liquid crystalline molecules (11f to 11j) on the lower substrate (14b) side are oriented substantially in reverse directions to each other (vertically synmetrically).

Figure 2:
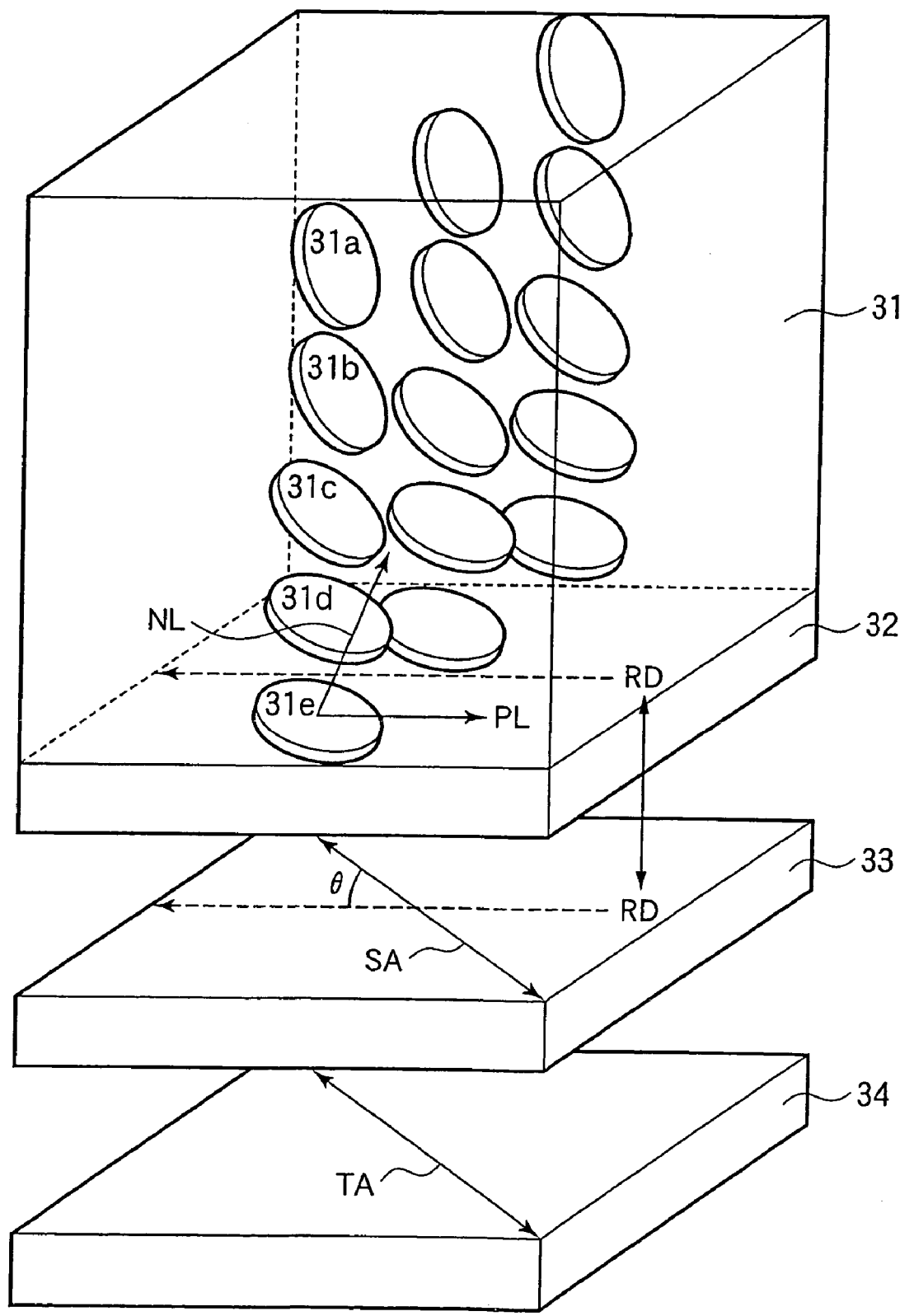
FIG. 2 is a schematic view showing an elliptically polarizing plate in accordance with the invention.

FIG. 2 is a schematic view showing the elliptically polarizing plate in accordance with the invention.

As is shown in FIG. 2, the elliptically polarizing plate comprises a laminate of an optically anisotropic layer (31) containing a discotic compound (31a to 31e), a transparent support (33) having an optical anisotropy and a polarizing membrane (34). The elliptically polarizing plate shown in FIG. 2 has an orientation membrane (32) between the optically anisotropic layer (31) and the transparent support (33).

The discotic compound (31a to 31e) contained in the optically anisotropic layer (31) is of plane molecules. The discotic compound (31a to 31e) has only one plane, i.e., a disc plane, within the molecule. The disc plane is inclined to the plane of the transparent support (33). The angle (inclination angle) between the disc plane and the support plane increases as the distance between the disc compound and the orientation membrane increases. The average inclination angle is in the range of from 25 to 35°. When the inclination angle is changed as shown in FIG. 2,the function of the elliptically polarizing plate to enlarge the viewing angle is markedly improved. The elliptically polarizing plate wherein the inclination angle has been changed also acquires the function of preventing inversion of a displayed image, change in gradation or generation of coloration.

The average direction of the orthogonally projected normal lines (NL) of the disc planes of the disc compound (31a to 31e) to the transparent support plane is reversely parallel to the rubbing direction (RD) of the orientation membrane (32). In the invention, the angle between the average direction of the orthogonally projected normal lines of the disc planes of the disc compound to the transparent support plane and the in-plane slow axis (SA) of the transparent support (33) is adjusted to substantially 45°. Therefore, in the process for producing the elliptically polarizing plate, it suffices to adjust the angle (θ) between the rubbing direction (RD) of the orientation membrane (32) and the in-plane slow axis (SA) of the transparent support to be substantially 45°.

Further, in the invention, it is preferred to dispose the transparent support and the polarizing membrane so that the in-plane slow axis (SA) of the transparent support (33) is substantially parallel or substantially vertical to the in-plane transmission axis (TA) of the polarizing membrane (34). In the elliptically polarizing plate shown in FIG. 2, a single transparent support is disposed in a parallel relation. The in-plane slow axis (SA) of the transparent support (33) coincides principally with the direction of stretching the transparent support. The in-plane transmission axis (TA) of the polarizing membrane (34) coincides principally with the direction vertical to the direction of stretching the polarizing membrane.

Figure 3:
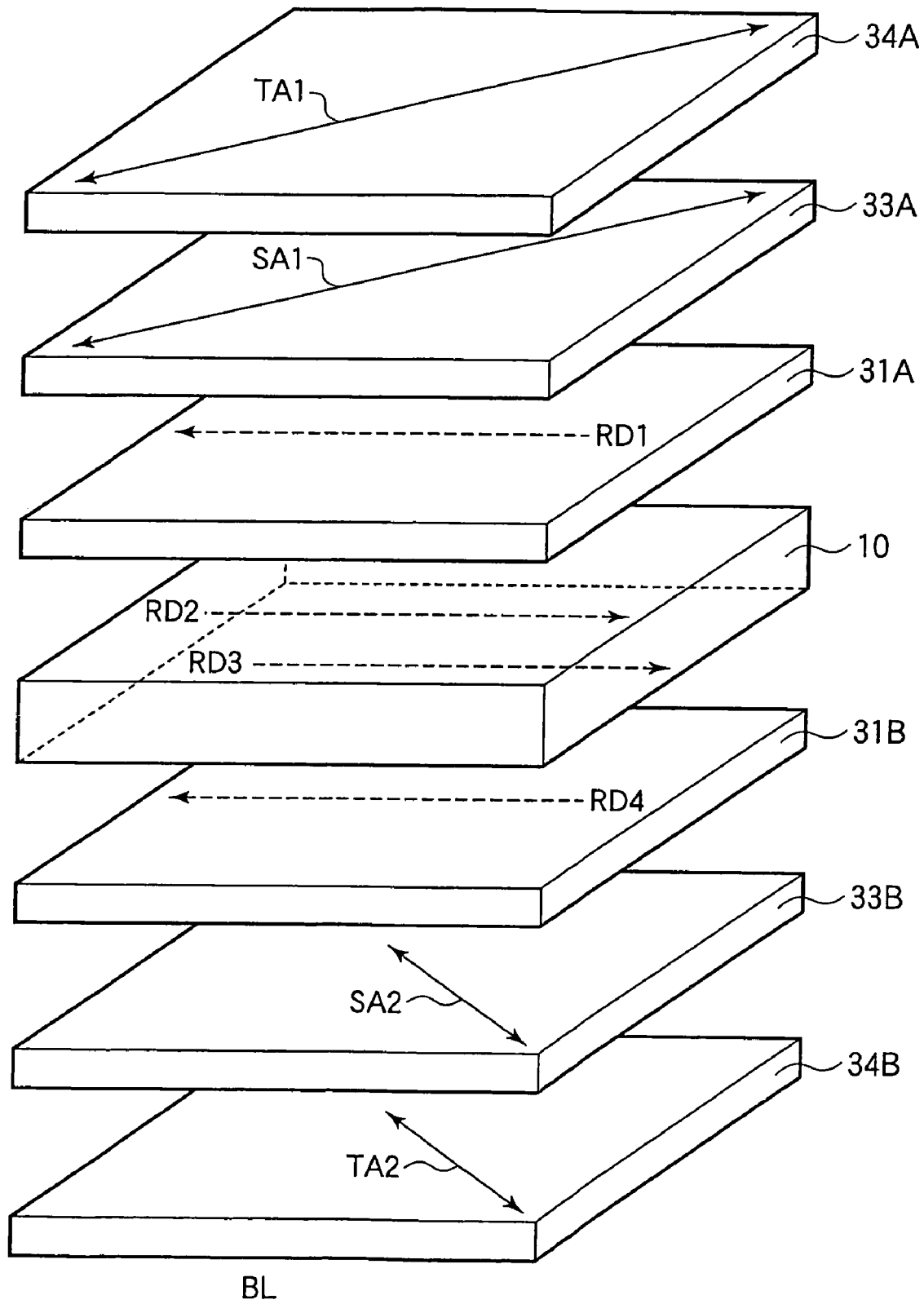
FIG. 3 is a schematic view showing a bend orientation mode liquid crystal display device in accordance with the invention.

FIG. 3 is a schematic view showing the bend orientation mode liquid crystal display device in accordance with the invention.

The liquid crystal display device shown in FIG. 3 comprises a bend orientation liquid crystal cell (10), a pair of elliptically polarizing plates disposed respectively on both sides of the liquid crystal cell (31A to 34A, 31B to 34B) and a backlight (BL).

The bend orientation liquid crystal cell (10) corresponds to the liquid crystal cell shown in FIG. 1. The rubbing directions (RD2, RD3) on respective sides of the liquid crystal cell (10) are the same (parallel).

Each of the elliptically polarizing plates are laminates of the optically anisotropic layer (31A, 31B), the transparent support (33A, 33B) and the polarizing membrane (34A, 34B) laminated in this order. The rubbing direction (RD1, RD4) for the discotic compound of the optically anisotropic layer (31A, 31B) is in a reversely parallel relation to the rubbing direction (RD2, RD3) of the facing liquid crystal cell. As has been mentioned hereinbefore, the rubbing direction (RD1, RD4) for the discotic compound is reversely parallel to the average direction of the orthogonally projected normal lines of the disc planes to the transparent support plane. The in-plane slow axis (SA1, SA2) of the transparent support (33A, 33B) and the in-plane transmission axis (TA1, TA2) of the polarizing membrane (34A, 34B) are substantially at an angle of substantially 45° with the rubbing direction (RD1, RD4) for the disc compound in the same plane. In addition, the two polarizing membranes (34A, 34B) are disposed so that their in-plane transmission axes (TA1, TA2) cross each other at right angles (cross-Nicol position).

Figure 4:
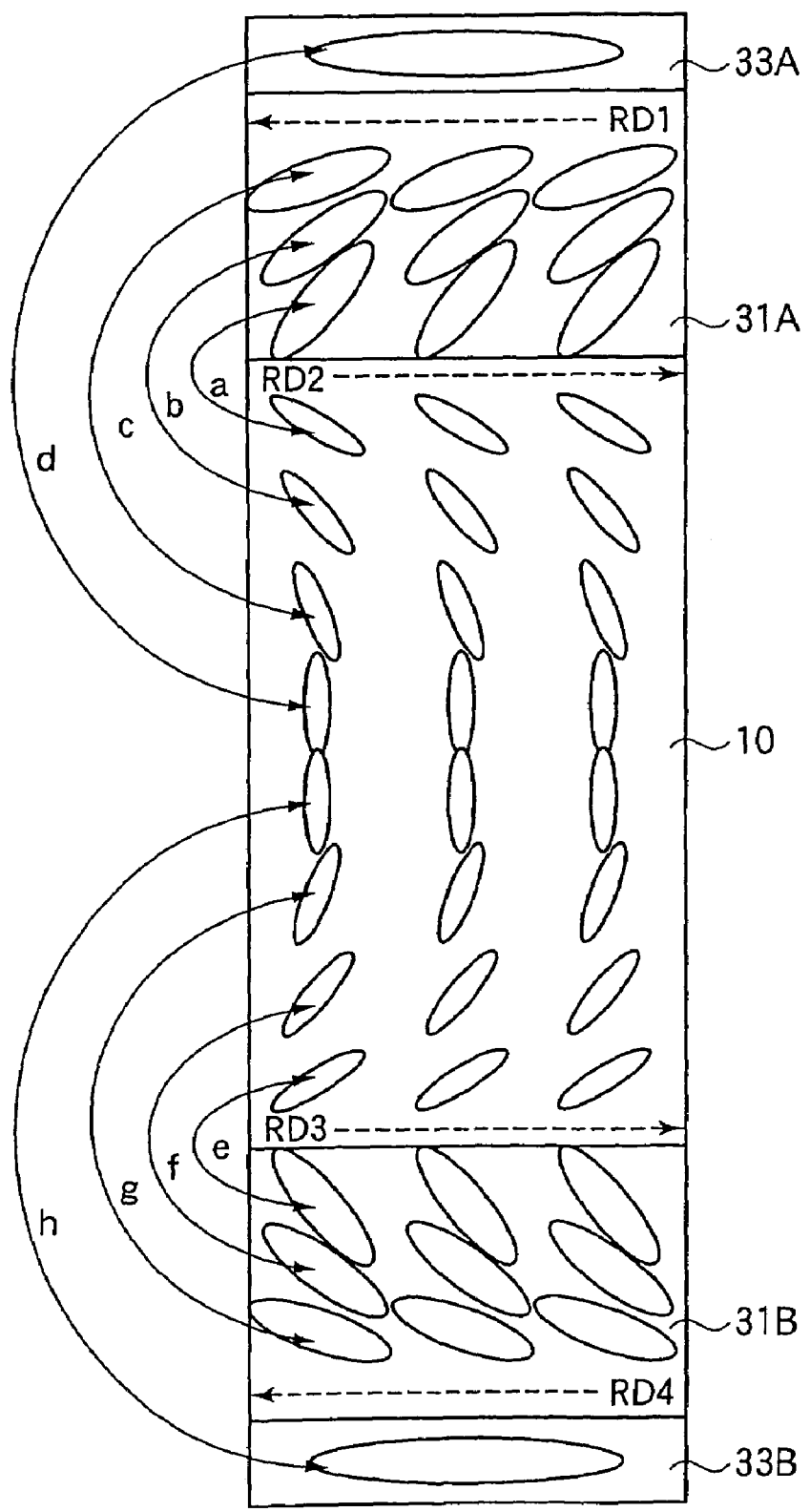
FIG. 4 is a conceptual view showing the relation in optical compensation in the bend orientation mode liquid crystal display device.

FIG. 4 is a conceptive view showing the relation of optical compensation in the bend orientation mode liquid crystal display device.

As is shown in FIG. 4, in the liquid crystal display device in accordance with the invention, the optically anisotropic layers (31A, 31B) containing the discotic compound cooperate with the optically anisotropic transparent supports (33A, 33B) to optically compensate the bend orientation liquid crystal cell (10).

By making the rubbing direction (RD1, RD4) for the discotic compound of the optically anisotropic layer (31A, 31B) reversely parallel to the rubbing direction (RD2, RD3) for the liquid crystal cell, the liquid crystalline molecules in the bend orientation liquid crystal cell (10) pair with the discotic compound in the optically anisotropic layer (31A, 31B) (a to c, e to g) to optically compensate. And, the substantially vertically oriented liquid crystalline molecules in the central portion of the bend orientation liquid cell (10) are designed to correspond to the optical anisotropy of the transparent support (33A, 33B) (d, h). Additionally, the ellipses drawn in the transparent support (33A, 33B) represent ellipses of refractive index generated by the optical anisotropy of the transparent support.

Figure 5:
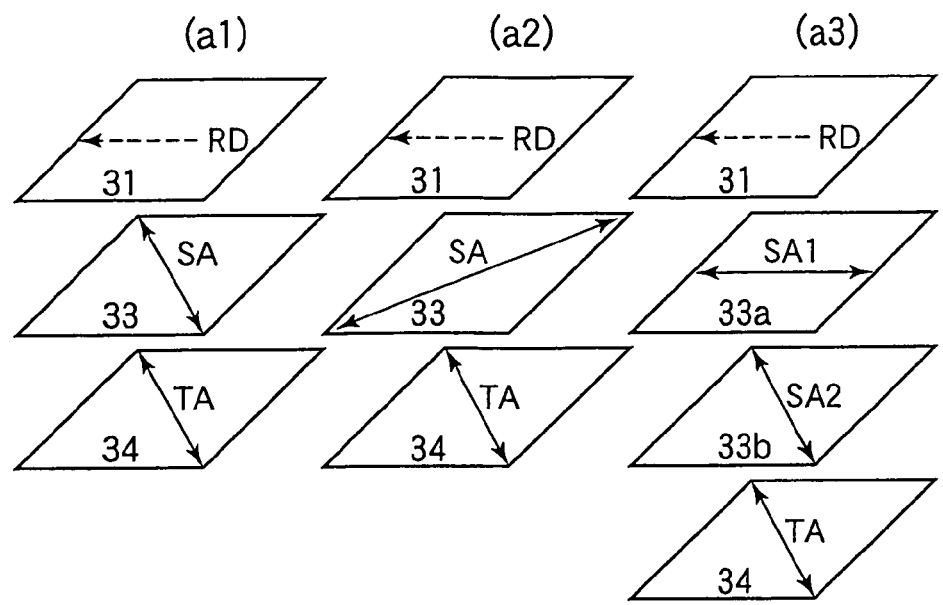
FIG. 5 is a schematic view showing various embodiments of the elliptically polarizing plate.
Figure 5:
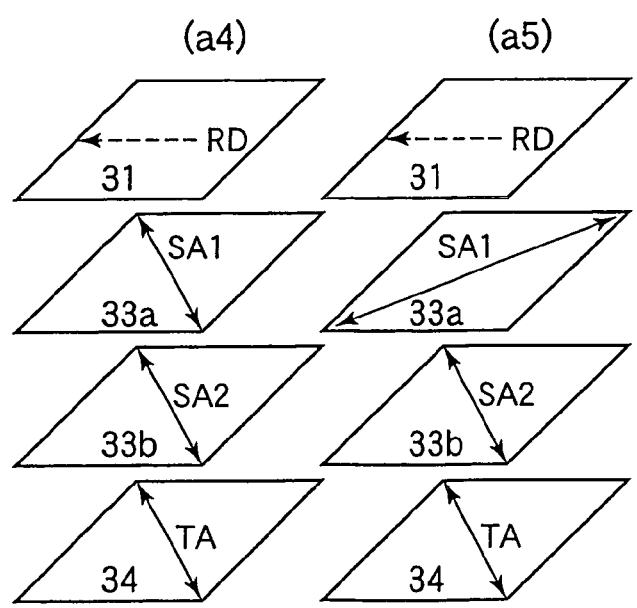

FIG. 5 is a schematic view showing various embodiments of the elliptically polarizing plates.

The embodiment shown by FIG. 5a1 corresponds to the most fundamental elliptically polarizing plate shown in FIG. 3. The elliptically polarizing plate of the embodiment a1 is a laminate of the optically anisotropic layer (31) containing the discotic compound, the optically anisotropic transparent support (33) and the polarizing membrane (34) laminated in this order. The angle between the rubbing direction (RD) for the discotic compound and the slow axis (SA) of the transparent support (33) is substantially 45°, and the slow axis (SA) of the transparent support (33) and the transmission axis (TA) of the polarizing membrane (34) are substantially parallel to each other.

The embodiment shown by FIG. 5a2 is also a laminate of the optically anisotropic layer (31) containing the discotic compound, the optically anisotropic transparent support (33) and the polarizing membrane (34) laminated in this order. The angle between the rubbing direction (RD) for the discotic compound and the slow axis (SA) of the transparent support (33) is substantially 45°, and the slow axis (SA) of the transparent support (33) and the transmission axis (TA) of the polarizing membrane (34) are substantially vertical to each other.

The embodiment shown by FIG. 5a3 has two transparent supports (33a, 33b). In the invention, it suffices that at least one of the two transparent supports (33b in FIG. 5a3) be disposed in such relation with the optically anisotropic layer (31) and the polarizing membrane (34) as to satisfy the aforementioned definition. That is, the angle between the rubbing direction (RD) for the discotic compound and the slow axis (SA2) of the transparent support (33b) is substantially 45°, and the slow axis (SA2) of the transparent support (33b) and the transmission axis (TA) of the polarizing membrane (34) are substantially parallel to each other. In the embodiment of a3, another transparent support (33a) is disposed so that the slow axis (SA1) becomes substantially parallel to the rubbing direction (RD) for the discotic compound as is the same in the prior art.

In the embodiment shown by FIG. 5a4, the two transparent supports (33a, 33b) are both disposed in such relation with the optically anisotropic layer (31) and the polarizing membrane (34) as to satisfy the aforesaid definition. That is, the angle between the rubbing direction (RD) for the discotic compound and each of the slow axes (SA1, SA2) of the two transparent supports (33a, 33b) is substantially 45°, and each of the slow axes (SA1, SA2) of the transparent supports (33a, 33b) and the transmission axis (TA) of the polarizing membrane (34) are substantially parallel to each other.

In the embodiment of FIG. 5a5, too, either of the two transparent supports (33a, 33b) is disposed in such relation with the optically anisotropic layer (31) and the polarizing layer (34) as to satisfy the aforementioned definition. That is, the angle between the rubbing direction (RD) for the discotic compound and each of the slow axes (SA1, SA2) of the two transparent supports (33a, 33b) is substantially 45°, and the slow axis (SA1) of the transparent support (33a) nearer to the optically anisotropic layer (31) and the transmission axis (TA) of the polarizing membrane (34) are substantially vertical to each other, and the slow axis (SA2) of the transparent support (33b) nearer to the polarizing membrane (34) and the transmission axis (TA) of the polarizing membrane (34) are substantially parallel to each other.

FIG. 6 is a schematic view showing other various embodiments of the elliptically polarizing plates.

The elliptically polarizing plate of the embodiment b1 in FIG. 6 is a laminate of the optically anisotropic transparent support (33), the optically anisotropic layer (31) containing the discotic compound, and the polarizing membrane (34) laminated in this order. The angle between the rubbing direction (RD) for the discotic compound and the slow axis (SA) of the transparent support (33) is substantially 45°, and the slow axis (SA) of the transparent support (33) and the transmission axis (TA) of the polarizing membrane (34) are substantially parallel to each other.

The embodiment shown by FIG. 6b2 is also a laminate of the optically anisotropic transparent support (33), the optically anisotropic layer (31) containing the discotic compound, and the polarizing membrane (34) laminated in this order. The angle between the rubbing direction (RD) for the discotic compound and the slow axis (SA) of the transparent support (33) is substantially 45°, and the slow axis (SA) of the transparent support (33) and the transmission axis (TA) of the polarizing membrane (34) are substantially vertical to each other.

The embodiment shown by FIG. 6b3 has two transparent supports (33a, 33b). In the invention, it suffices that at least one of the two transparent supports (33b in FIG. 6b3) be disposed in such relation with the optically anisotropic layer (31) and the polarizing membrane (34) as to satisfy the aforementioned definition. That is, the angle between the rubbing direction (RD) for the discotic compound and the slow axis (SA2) of the transparent support (33b) is substantially 45°, and the slow axis (SA2) of the transparent support (33b) and the transmission axis (TA) of the polarizing membrane (34) are substantially parallel to each other. In the embodiment of b3, another transparent support (33a) is disposed so that the slow axis (SA1) becomes substantially parallel to the rubbing direction (RD) for the discotic compound as is the same in the prior art.

In the embodiment shown by FIG. 6b4, the two transparent supports (33a, 33b) are both disposed in such relation with the optically anisotropic layer (31) and the polarizing membrane (34) as to satisfy the aforesaid definition. That is, the angle between the rubbing direction (RD) for the discotic compound and each of the slow axes (SA1, SA2) of the two transparent supports (33a, 33b) is substantially 45°, and each of the slow axes (SA1, SA2) of the transparent supports (33a, 33b) and the transmission axis (TA) of the polarizing membrane (34) are substantially parallel to each other.

In the embodiment of FIG. 6b5, too, either of the two transparent supports (33a, 33b) is disposed in such relation with the optically anisotropic layer (31) and the polarizing layer (34) as to satisfy the aforementioned definition. That is, the angle between the rubbing direction (RD) for the discotic compound and each of the slow axes (SA1, SA2) of the two transparent supports (33a, 33b) is substantially 45°, and the slow axis (SA1) of the transparent support (33a) farther to the optically anisotropic layer (31) and the transmission axis (TA) of the polarizing membrane (34) are substantially vertical to each other, and the slow axis (SA2) of the transparent support (33b) nearer to the polarizing membrane (34) and the transmission axis (TA) of the polarizing membrane (34) are substantially parallel to each other.

[Optical Properties of the Elliptically Polarizing Plate]

The elliptically polarizing plate has the optically anisotropic layer containing a discotic compound, the optically anisotropic transparent support and the polarizing membrane.

The optically anisotropic layer preferably has no direction wherein the retardation value becomes 0 (optical axis). Also, the optically anisotropic layer preferably has no direction wherein the absolute value of retardation becomes minimal within the plane of the optically anisotropic layer and in the normal direction against the optically anisotropic layer.

As the optical properties of the transparent support, the $Re_2$ retardation value defined by the following formula (I) and the $Rth_2$ retardation value defined by the following formula (II):

$$Re_2 = (nx_2 - ny_2) \times d_2 \quad (I)$$

$$Rth_2 = [(nx_2 + ny_2)/2 - nz_2] \times d_2 \quad (II)$$

In the above formulae, $nx_2$ represents a refractive index of the in-plane slow axis of the transparent support, $ny_2$ represents a refractive index of the in-plane fast axis of the transparent support, $nz_2$ represents the thickness of the transparent support, and $d_2$ represents the thickness of the transparent support.

The $Re_1$ retardation value measured in the front of the face of the optically anisotrpic layer in accordance with the invention is 25 to 50 nm, preferably 28 to 48 nm.

Also, an average of the angles between the disc plane of the discotic compound in the optically anisotropic layer and the transparent support plane (inclined angles) is 25 to 35°, preferably 30 to 35°.

As to preferred retardation values of the transparent support, the $Re_2$ retardation value in the case of the elliptically polarizing plate being used in the bend orientation liquid crystal cell (a laminate of two or more transparent supports in the case of using two or more transparent supports) is preferably 0 to 100 nm, more preferably 17 to 70 nm, and the $Rth_2$ retardation value is preferably 10 to 1000 nm, more preferably 70 to 300 nm.

[Optically Anisotropic Layer]

The optically anisotropic layer contains the discotic compound. The optically anisotropic layer preferably comprises an obliquely inclined discotic compounds having a negative uniaxiality. As shown in FIG. 2, the discotic compound is preferably aligned so that the angle between the disc plane of the discotic compound and the transparent support plane varies in the depthwise direction of the optically anisotropic layer (hybrid orientation). An optical axis of the discotic compound exists in the normal direction against the disc plane. The discotic compound has such birefringence that the refrax index in the disc plane direction is larger than the refrax index in the optical axis.

The optically anisotropic layer is formed preferably by orienting the discotic liquid crystalline compound using an orientation membrane to be described hereinafter, and fixing the discotic compound in the thus oriented state. The discotic compound is fixed preferably by polymerization reaction.

Additionally, the optically anisotropic layer preferably has no direction wherein the retardation value becomes 0. In other words, the minimum retardation value of the optically anisotropic layer exceeds 0.

The discotic compounds are described in various literatures (C. Destrade et al., Mol.Crysr. Liq. Cryst., vol. 71, page 111 (1981); Kikan Kagaku Sosetsu, No. 22, Ekisho No Kagaku, Chapters 5, 10, Section 2 (1994), compiled by Nihon Kagaku Kai; B. Kohne et al., Angew. Chem. Soc. Chem. Comm., page 1794 (1985); J. Zhang et al., J. Am. Chem. Soc., vol. 116, page 2655 (1994)). As to polymerization of the discotic compound, descriptions are given in JP-A-8-27284.

In order to fix the discotic compound by polymerization, it is necessary to bind a polymerizable group as a substituent to the discotic core of the discotic compound. However, direct bonding of the polymerizable group to the discotic core would make it difficult to keep the orientation state during the polymerization reaction. Thus, a linking group is introduced between the discotic core and the polymerizable group. Accordingly, the discotic compound having the polymerizable group is preferably a compound represented by the following formula (I):

$$D(-L-P)n \quad (I)$$

In the above formula, D represents a discotic core, L represents a divalent linking group, P represents a polymerizable group, and n represents an integer of 4 to 12.

As to such discotic compounds, descriptions are given in JP-A-11-316378, [0027] to [0047].

The optically anisotropic layer is obtained by coating a solution of a discotic compound and other compounds in a solvent on an orientation membrane, drying, heating to a temperature at which a discotic nematic phase is formed, and cooling with maintaining the orientation state (discotic nematic phase). Alternatively, the optically anisotropic layer is obtained by coating s solution of a compound having a discotic structural unit or units and other compound (further, for example, a polymerizable monomer, a photo-polymerization initiator) on an orientation membrane, drying, heating to a temperature at which a discotic nematic phase is formed, polymerizing (by, for example, irradiation with UV light), and cooling. The discotic nematic liquid crystal phase-solid phase conversion temperature of the compound having the discotic structural unit or units to be used in the invention is preferably 70 to 300 C, particularly preferably 70 to 170 C which is lower than the thermal deformation temperature of the support.

The inclined angle of the discotic compound in the vicinity of the support can generally be adjusted by selecting kind of the discotic compound or material for the orientation membrane, or by selecting a rubbing treatment. Also, the inclined angle of the discotic compound on the surface side (air side) can generally be adjusted by selecting kind of the discotic compound or other compounds to be used together with the discotic compound (for example, a plasticizer, a surfactant, a polymerizable monomer and a polymer). Further, degree of change of the inclined angle can also be adjusted by the above selection.

As the plasticizers, surfactants and polymerizable monomers, any compound may be used that has an enough compatibility with the discotic compound and can cause change in the inclined angle of the disc plane or does not inhibit orientation. Of these, polymerizable monomers (for example, compounds having a vinyl group, a vinyloxy group, an acryloyl group or amethacryloyl group) are preferred. The above-mentioned compounds are used generally in an amount of 1 to 50% by weight (preferably 5 to 30% by weight) based on the discotic compound.

As the polymer, any polymer may be used that has an enough compatibility with the discotic compound and can cause change in the inclined angle of the discotic compound. As the examples of the polymers, there may be illustrated cellulose esters. Preferred examples of the cellulose esters include cellulose acetate, cellulose acetate propionate, hydroxypropyl cellulose and cellulose acetate butyrate. The polymer is used in an amount of generally 0.1 to 10% by weight (preferably 0.1 to 8% by weight, particularly 0.1 to 5% by weight) based on the compound having discotic structural unit or units so as not to inhibit orientation of the compound having the discotic structural unit or units.

The butyrylation degree of cellulose acetate butyrate is preferably 30% or more, particularly preferably in the range of 30 to 80%. The viscosity of cellulose acetate butyrate (value obtained by measuring according to ASTMD-817-72) is preferably in the range of 0.01 to 20 seconds.

The thickness of the optically anisotropic layer is preferably 0.5 to 100 μm, more preferably 0.5 to 30 μm.

In the invention, it is preferred to fix the oriented discotic liquid crystalline compound with maintaining the compound in the oriented state. Fixation is preferably conducted by polymerization reaction. Such polymerization reaction includes a thermal polymerization reaction using a thermal polymerization initiator and a photo polymerization reaction using a photo polymerization initiator, with the photo polymerization reaction being preferred.

Examples of the photo polymerization initiator include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), a combination of triarylimidazole dimer and p-aminophenylketone (described in U.S. Pat. No. 3,549,367), acridine and phenazine compounds (described in JP-A-60-105667 and U.S. Pat. No. 4,239,850) and oxadiazole compounds (described in U.S. Pat. No. 4,212,970).

The amount of the photo polymerization initiator is preferably 0.01 to 20% by weight of the solid components in the coating solution, with 0.5 to 5% by weight being more preferred.

Irradiation with a light for polymerizing the discotic compound is conducted by using preferably UV rays.

The irradiation energy is preferably 20 to 5000 mJ/cm$^2$, more preferably 100 to 800 mJ/cm$^2$. Also, the irradiation with a light may be conducted under heating in order to accelerate the photo polymerization reaction. A protective layer may be provided on the optically anisotropic layer.

[Orientation Membrane]

The orientation membrane functions to determine the orientation direction of the discotic liquid crystalline compound in the optically anisotropic layer.

The orientation membrane can be provided by rubbing treatment of an organic compound (preferably a polymer), rhombic vacuum deposition, formation of a layer having microgrooves or by accumulation of an organic compound (for example, ω-tricosanoic acid, dioctadecylmethylammonium chloride or methyl stearate) according to Langmuir-Brojet method (LB membrane). Further, an orientation membrane acquiring an orienting function upon application of an electric field or a magnetic field or upon irradiation with a light is also known.

The orientation membrane is formed preferably by rubbing treatment of a polymer. Polyvinyl alcohol is a preferred polymer. Modified polymers to which hydrophobic groups are bound are particularly preferred. Since the hydrophobic groups have an affinity for the discotic liquid crystalline compound in the optically anisotropic layer, introduction of the hydrophobic group into polyvinyl alcohol serves to uniformly orient the discotic liquid crystalline compound.

The hydrophobic groups are bound to the termini or side chain of the main chain of polyvinyl alcohol.

As the hydrophobic group, aliphatic groups containing 6 or more carbon atoms (preferably an alkyl group or an alkenyl group) or aromatic groups.

In the case of binding the hydrophobic group to the termini of the main chain of polyvinyl alcohol, it is preferred to introduce a linking group between the hydrophobic group and the main chain terminus. Examples of the linking group include —S—, —C(CN)R$_1$—, —NR$_2$—, —CS— and a combination thereof. R$_1$ and R$_2$ each represents a hydrogen atom or an alkyl group containing 1 to 6 carbon atoms (preferably an alkyl group containing 1 to 6 carbon atoms).

In the case of introducing the hydrophobic group into the side chain of polyvinyl alcohol, it suffices to replace part of the acetyl groups (—CO—CH$_3$) of vinyl acetate unit of polyvinyl alcohol by an acyl group (—CO—R$_3$) containing 7 or more carbon atoms. R$_3$ represents an aliphatic group containing 6 or more carbon atoms or an aromatic group.

Commercially available polyvinyl alcohols (for example, MP103, MP203 and R1130 made by Kurarey Co., Ltd.).

The saponification degree of (modified) polyvinyl alcohol to be used for the orientation membrane is preferably 80% or more. The polymerization degree of (modified) polyvinyl alcohol is preferably 200 or more.

The rubbing treatment is conducted by rubbing the surface of the orientation membrane several times in a definite direction. It is preferred to use cloth having fibers of uniform length and uniform thickness uniformly filled therein.

Additionally, even when the orientation membrane is removed after orienting the discotic compound in the optically anisotropic layer by using the orientation membrane, the discotic compound can be kept in the oriented state. That is, although the orientation membrane is necessary in producing an elliptically polarizing plate in order to orient the discotic compound, it is not necessary in the produced elliptically polarizing membrane.

In the case of providing the orientation membrane between the transparent support and the optically anisotropic layer, it is preferred to further provide an undercoating layer (adhesive layer) between the transparent support and the orientation membrane.

[Transparent Support]

The transparent support is preferably formed from a transparent polymer having a positive intrinsic birefringence. The transparent support means to have a light transmission of 80% or more.

A polymer film obtained by plane orientation of the polymer having a positive intrinsic birefringence generally has a negative refractive index ellipse. As to its optical axis, there is one optical axis in the normal direction or two axes in the same angle sandwitching the normal. In the invention, it is preferred to use a polymer film having such optical properties as a transparent support in combination with an optically anisotropic layer having a negative intrinsic birefringence and containing a discotic compound whose optical axis exists in the normal direction against the disc plane.

Examples of the polymer include polycarbonate, polyarylate, polysulfone, polyether sulfone and cellulose ester (e.g., diacetyl cellulose or triacetyl cellulose). Polycarbonates and cellulose esters are preferred. The polymer film is preferably formed by the solvent cast method.

The transparent support may be a single layer or a laminate of two or more layers. With the laminate of two or more layers, it is preferred to laminate cellulose ester films (preferably triacetyl cellulose films) or polycarbonate films alone or in combination in kind.

In the invention, the transparent support preferably comprises a single layer or a laminate of two or more layers, with the single layer or the laminate of two or more layers comprising cellulose ester film or films. More preferably, the layer or the laminate comprises cellulose acetate having an acetylation degree of 59.0 to 61.5%, and contains 0.01 to 20 parts by weight of an aromatic compound containing at least two aromatic rings per 100 parts by weight of cellulose acetate.

The slow axis of the transparent support corresponds to the stretching direction of the polymer film, provided that, in the case of not conducting a special stretching treatment, the polymer is stretched in the lengthwise direction of roll during its production process. With a certain optical anisotropy of some liquid crystal cells or some optically anisotropic layers, sufficient advantages of the invention may in some cases be obtained even by the optical anisotropy generated by natural stretching in such production process.

The thickness of the transparent support (in the case of using a laminate of two or more layers, total thickness) is preferably 20 to 500 µm, more preferably 50 to 200 µm.

In order to improve adhesion between the transparent support and a layer to be provided thereon (an adhesive layer, an orientation membrane or an optically anisotropic layer), the transparent support may be subjected to surface treatment (for example, glow discharge treatment, corona discharge treatment, UV ray treatment or flame treatment). It is preferred to conduct glow discharge treatment or corona discharge treatment. Two or more surface treatments may be conducted in combination.

An adhesive layer (undercoating layer) may be provided on the transparent support. The adhesive layer is preferably formed by coating a hydrophilic polymer (e.g., gelatin). The thickness of the adhesive layer is preferably 0.1 to 2 µm, more preferably 0.2 to 1 µm.

A protective layer may be provided on the back surface of the transparent support.

[Polarizing Membrane]

The polarizing membrane includes an iodine-based polarizing membrane, a dye-based polarizing membrane using a dichroic dye and a polyene-based polarizing membrane. The iodine-based polarizing membrane and the dye-based polarizing membrane are generally produced by using a polyvinyl alcohol-based film.

Transmission axis of the polarizing membrane corresponds to the vertical direction to the stretching direction of the film.

The polarizing membrane generally has a protective membrane. However, in the elliptically polarizing plate of the invention, the transparent support may also function as a protective membrane for the polarizing membrane. In the case of using a particular protective membrane for the polarizing membrane besides the transparent support, it is preferred to use a cellulose ester film having a high optical anisotropy, particularly a triacetyl cellulose film, as the protective membrane. In the case of using the elliptically polarizing plate of the invention as only one of a pair of polarizing elements, other polarizing element is preferably a laminate of a polarizing membrane and a protective membrane.

[Preparation of Elliptically Polarizing Membrane]

The elliptically polarizing membrane can be prepared continuously in the following manner.

First, an orientation membrane is formed on a transparent support, followed by rubbing treatment of the orientation membrane at an angle of 45° to the direction of conveying the transparent support (slow axis being in the same direction). Subsequently, an optically anisotropic layer is formed on the orientation membrane, followed by winding up. Then, in order to prevent flaws of the optically anisotropic layer and deposition of dust thereon, the optically anisotropic layer-formed film is unwound and the optically anisotropic layer side of the film is laminated with a laminate film, followed by winding up again. In the case of using two transparent supports, a second transparent support is laminated on the transparent support surface of the roll film having laminated thereon the laminate film via an adhesive. In the case of using three or more transparent supports, the treatment is successively repeated to laminate using the adhesive.

Finally, a polarizing membrane is laminated on the outermost transparent support via an adhesive.

In order to reduce the number of winding and unwinding steps, it is preferred to conduct lamination of the laminate film, second and later transparent supports and polarizing membrane successively immediately after formation of the optically anisotropic layer.

[Liquid Crystal Cell]

The elliptically polarizing plate of the invention is used in combination with a bend orientation liquid crystal cell using a low temperature polysilicon TFT to constitute a liquid crystal display device.

In the bend orientation liquid crystal cell, liquid crystalline molecules in the central portion of the cell may be in a twist orientation. In the bend orientation liquid crystal cell, the product ($\Delta n \times d$) of the refractive index anisotropy of the liquid crystalline compound $\Delta n$ and the thickness of the liquid crystal layer of the liquid crystal cell d is preferably in the range of 100 to 2000 nm, more preferably 150 to 1700 nm, most preferably 500 to 1500 nm, for the purpose of attaining both luminance and viewing angle.

The bend orientation liquid crystal cell may be used in a normally white mode (NW mode) or a normally black mode (NB), preferably in a normally white mode.

[Low-temperature Polysilicon TFT]

The low temperature polysilicon TFT means a polysilicon TFT system using a polycrystalline Si type TFT switch matrix formed by developing crystal grains through laser irradiation of amorphous Si thin film formed on a quartz substrate or the like, followed by gradual cooling or formed by decomposing and vacuum depositing $SiH_4$ or $Si_6H_6$ onto a substrate according to a CVD method under reduced pressure. Also, there is a polysilicon TFT-forming process such as MILC process of enlarging the grains by accelerating development of crystal in the in-place direction of the substrate using a metallic catalyst, with CG silicon being one of them. In addition, there is crystal silicon. The polysilicon TFTs are grouped into those of a high-temperature process and those of a low-temperature process, and are generally called high temperature polysilicon TFT and low temperature polysilicon TFT, respectively. The high temperature process has the difficulty that a quartz substrate capable of resisting a process temperature of 1000° C. or higher is to be used, but is excellent in reproducibility, stability, and mass productivity. On the other hand, the low temperature process is a process of forming polysilicon TFT on an inexpensive, large-sized glass substrate at a process temperature of 600° C. or less, if possible 400° C. or less, which enables one to reduce the cost of LCD and enlarge LCD. Additionally, detailed descriptions on the polysilicon TFT are given in Ekisho Display Gijutsu-Active Matrix LCD (book). The voltage to be applied to the liquid crystal display device in displaying black is in a range of preferably 3.0 to 5.5 V, more preferably 3.5 to 5.0 V.

EXAMPLES

The invention is described in more detail by reference to Examples which, however, are not to be construed as limiting the invention in any way.

Example 1

(Preparation of Transparent Support)

(Preparation of Cellulose Ester Film SE1)

45 parts by weight of cellulose acetate having an average acetylation degree of 60.9%, 3.62 parts by weight of a retardation increasing agent to be described below, 232.72 parts by weight of methylene chloride, 42.57 parts by weight of methanol and 8.50 parts by weight of n-butanol were mixed at room temperature to prepare a solution (dope). The thus-obtained dope was cast in a dry thickness of 50 μm using a band casting machine of 6 m in effective length to conduct tenter stretch-filming, followed by drying.

In-plane retardation ($Re_2$) at a wavelength of 632.8 nm and retardation ($Rth_2$) in the thickness direction of the thus-obtained cellulose ester film (SE1) were measured using an ellipsometer (M-150; made by Nihon Bunko K.K.), and were found to be 20 nm and 95 nm, respectively.

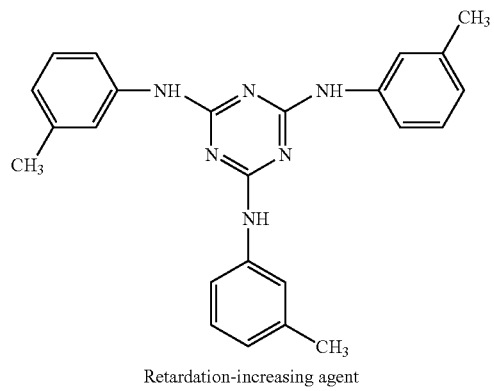

Retardation-increasing agent (Formation of Orientation Membrane)

An undercoating gelatin layer was provided on a transparent support and, further, a coating solution of the following formulation was coated thereon in an amount of 28 ml/m using a #16 wire bar coater, followed by drying for 60 seconds with a 60° C. warm air, then for 150 seconds with a 90° C. warm air.

Next, the formed membrane was rubbing treated in the direction at an angle of 45° to the slow axis (measured at a wavelength of 632.8 nm) of the transparent support.

Formulation of the Coating Solution for Forming the Orientation Membrane:

| | |
|---|---|
| Modified polyvinyl alcohol shown below | 10 parts by weight |
| Water | 371 parts by weight |
| Methanol | 119 parts by weight |
| Glutaraldehyde (crosslinking agent) | 0.5 part by weight |

Modified polyvinyl alcohol

—(CH$_2$—CH)$_{87.8}$—
          |
          OH

—(CH$_2$—CH)$_{0.2}$—
          |
          O
          |
          CO
          |
          [benzene ring]
          |
          O—(CH$_2$)$_4$—O—CO—CH=CH$_2$

—(CH$_2$—CH)$_{12.0}$—
          |
          O—CO—CH$_3$ (Formation of Optically Anisotropic Layer)

A coating solution prepared by dissolving 41.01 g of the following discotic (liquid crystalline) compound (discotic liquid crystalline compound), 4.06 g of ethylene oxide-modified trimethylolpropane triacrylate (V#360; made by Osaka Yuki Kagaku K.K.), 0.69 g of cellulose acetate butyrate (CAB531-1; made by Eastman Chemical Co.), 1.35 g of a photo polymerization initiator (Irgacure 907; made by Ciba Geigy Co.), and 0.45 g of a sensitizing agent (Kayacure DETX; made by Nihon Kayaku K.K.) in 010 g of methyl ethyl ketone was coated on the orientation membrane using a #3 wire bar. This was adhesively fixed to a metal frame, heated in a 130° C. termostatic chamber for 2 minutes to thereby orient the discotic compound. Next, the discotic compound was polymerized by irradiating with UV rays at 130° C. for 1 minute using a 120 W/cm high-pressure mercury lamp, followed by being allowed to cool to room temperature. Thus, an optically anisotropic layer was formed.

The $Re_1$ retardation value measured in front of the face of the optically anisotropic layer measured at a wavelength of 632.8 nm was 38 nm. Also, the angle between the disc plane and the first transparent support plane (inclined angle) was 34° on the average.

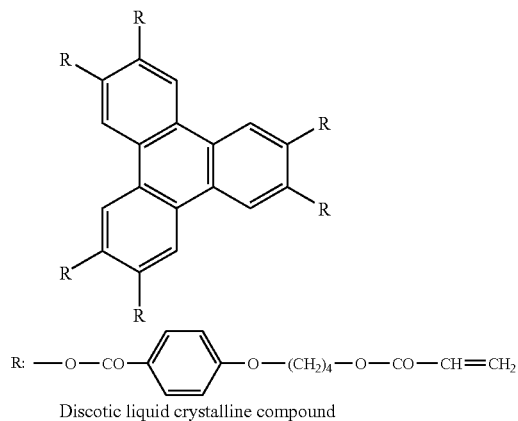

Discotic liquid crystalline compound (Preparation of Elliptically Polarizing Plate)

A polarizing membrane was laminated on the optically anisotropic layer and the transparent support via an adhesive layer to prepare an elliptically polarizing plate. The transmission axis of the polarizing membrane was made to meet at right angles with the slow axis of the transparent support.

Example 2

(Preparation of Transparent Support)

(Preparation of Cellulose Ester Film SE2)

45 parts by weight of cellulose acetate having an average acetylation degree of 60.9%, 3.62 parts by weight of the retardation increasing agent, 232.72 parts by weight of methylene chloride, 42.57 parts by weight of methanol and 8.50 parts by weight of n-butanol were mixed at room temperature to prepare a solution (dope).

The thus-obtained dope was cast in a dry thickness of 100 μm using a band casting machine of 6 m in effective length to conduct tenter stretch-filming, followed by drying.

In-plane retardation ($Re_2$) at a wavelength of 632.8 nm and retardation ($Rth_2$) in the thickness direction of the thus-obtained cellulose ester film (SE2) were measured using an ellipsometer (M-150; made by Nihon Bunko K.K.), and were found to be 44 nm and 167 nm, respectively.

(Formation of Orientation Membrane)

An orientation membrane was formed in the same manner as with the orientation membrane of Example 1.

(Formation of Optically Anisotropic Layer)

An optically anisotropic layer was formed in the same manner as with the optically anisotropic layer of Example 1.

(Preparation of Elliptically Polarizing Plate)

A polarizing membrane was laminated on the optically anisotropic layer and the transparent support via an adhesive layer to prepare an elliptically polarizing plate. The transmission axis of the polarizing membrane was made at right angles with the slow axis of the transparent support.

Example 3

(Preparation of Transparent Support)

(Preparation of Cellulose Ester Film SE3)

45 parts by weight of cellulose acetate having an average acetylation degree of 60.9%, 3.62 parts by weight of the retardation increasing agent, 232.72 parts by weight of methylene chloride, 42.57 parts by weight of methanol and 8.50 parts by weight of n-butanol were mixed at room temperature to prepare a solution (dope).

The thus-obtained dope was cast in a dry thickness of 80 μm using a band casting machine of 6 m in effective length to conduct tenter stretch-filming, followed by drying.

In-plane retardation ($Re_2$) at a wavelength of 632.8 nm and retardation ($Rth_2$) in the thickness direction of the thus-obtained cellulose ester film (SE3) were measured using an ellipsometer (M-150; made by Nihon Bunko K.K.), and were found to be 35 nm and 134 nm, respectively.

(Formation of Orientation Membrane)

An orientation membrane was formed in the same manner as with the orientation membrane of Example 1.

(Formation of Optically Anisotropic Layer)

An optically anisotropic layer was formed in the same manner as with the optically anisotropic layer of Example 1.

(Preparation of Elliptically Polarizing Plate)

A polarizing membrane was laminated on the optically anisotropic layer and the transparent support via an adhesive layer to prepare an elliptically polarizing plate. The transmission axis of the polarizing membrane was made at right angles with the slow axis of the transparent support.

Example 4

(Preparation of Transparent Support)

(Preparation of Cellulose Ester Film SE4)

45 parts by weight of cellulose acetate having an average acetylation degree of 60.9%, 3.62 parts by weight of the retardation increasing agent, 232.72 parts by weight of methylene chloride, 42.57 parts by weight of methanol and 8.50 parts by weight of n-butanol were mixed at room temperature to prepare a solution (dope).

The thus-obtained dope was cast in a dry thickness of 150 μm using a band casting machine of 6 m in effective length to conduct tenter stretch-filming, followed by drying.

In-plane retardation ($Re_2$) at a wavelength of 632.8 nm and retardation ($Rth_2$) in the thickness direction of the thus-obtained cellulose ester film (SE4) were measured using an ellipsometer (M-150; made by Nihon Bunko K.K.), and were found to be 55 nm and 246 nm, respectively.

(Formation of Orientation Membrane)

An orientation membrane was formed in the same manner as with the orientation membrane of Example 1.

(Formation of Optically Anisotropic Layer)

An optically anisotropic layer was formed in the same manner as with the optically anisotropic layer of Example 1.

(Preparation of Elliptically Polarizing Plate)

A polarizing membrane was laminated on the optically anisotropic layer and the transparent support via an adhesive layer to prepare an elliptically polarizing plate. The transmission axis of the polarizing membrane was made at right angles with the slow axis of the transparent support.

Example 5

(Preparation of Transparent Support)

(Preparation of Cellulose Ester Film SE5)

45 parts by weight of cellulose acetate having an average acetylation degree of 60.9%, 4.38 parts by weight of the retardation increasing agent, 232.72 parts by weight of methylene chloride, 42.57 parts by weight of methanol and 8.50 parts by weight of n-butanol were mixed at room temperature to prepare a solution (dope).

The thus-obtained dope was cast in a dry thickness of 80 μm using a band casting machine of 6 m in effective length to conduct tenter stretch-filming, followed by drying.

In-plane retardation ($Re_2$) at a wavelength of 632.8 nm and retardation ($Rth_2$) in the thickness direction of the thus-obtained cellulose ester film (SE5) were measured using an ellipsometer (M-150; made by Nihon Bunko K.K.), and were found to be 31 nm and 165 nm, respectively.

(Formation of Orientation Membrane)

An orientation membrane was formed in the same manner as with the orientation membrane of Example 1.

(Formation of Optically Anisotropic Layer)

An optically anisotropic layer was formed in the same manner as with the optically anisotropic layer of Example 1.

(Preparation of Elliptically Polarizing Plate)

A polarizing membrane was laminated on the optically anisotropic layer and the transparent support via an adhesive layer to prepare an elliptically polarizing plate. The transmission axis of the polarizing membrane was made at right angles with the slow axis of the transparent support.

Example 6

(Preparation of Transparent Support)

Two sheets of the cellulose ester film SE1 made in Example 1 were prepared, with one being a first transparent support, and the other being a second transparent support. Then, the first transparent support was laminated to the second transparent support via an adhesive. The slow axis of the first transparent support and the slow axis of the second transparent support were made parallel to each other.

In-plane retardation ($Re_2$) at a wavelength of 632.8 nm and retardation ($Rth_2$) in the thickness direction of the thus-obtained cellulose ester film (SE6) were measured using an ellipsometer (M-150; made by Nihon Bunko K.K.), and were found to be 40 nm and 190 nm, respectively.

(Formation of Orientation Membrane)

An orientation membrane was formed in the same manner as with the orientation membrane of Example 1.

(Formation of Optically Anisotropic Layer)

An optically anisotropic layer was formed in the same manner as with the optically anisotropic layer of Example 1.

(Preparation of Elliptically Polarizing Plate)

A polarizing membrane was laminated on the optically anisotropic layer and the transparent support via an adhesive layer to prepare an elliptically polarizing plate. The transmission axis of the polarizing membrane was made at right angles with the slow axis of the transparent support.

Comparative Example 1

(Preparation of Transparent Support)

A transparent support was prepared in the same manner as with cellulose ester film SE5 prepared in Example 5.

(Formation of Orientation Membrane)

An orientation membrane was formed in the same manner as with the orientation membrane in Example 1.

(Formation of Optically Anisotropic Layer)

A coating solution prepared by dissolving 41.01 g of the discotic (liquid crystalline) compound used in Example 1, 4.06 g of ethylene oxide-modified trimethylolpropane triacrylate (V#360; made by Osaka Yuki Kagaku K.K.), 0.90 g of cellulose acetate butyrate (CAB531-1; made by Eastman Chemical Co.), 1.35 g of a photo polymerization initiator (Irgacure 907; made by Ciba Geigy Co.), and 0.45 g of a sensitizing agent (Kayacure DETX; made by Nihon Kayaku K.K.) in 101 g of methyl ethyl ketone was coated on the orientation membrane using a #4 wire bar. This was adhesively fixed to a metal frame, heated in a 130° C. termostatic chamber for 2 minutes to thereby orient the discotic compound. Next, the discotic compound was polymerized by irradiating with UV rays at 130° C. for 1 minute using a 120 W/cm high-pressure mercury lamp, followed by being allowed to cool to room temperature. Thus, an optically anisotropic layer was formed.

The $Re_1$ retardation value of the optically anisotropic layer measured in front of the face at a wavelength of 632.8 nm was 55 nm. Also, the angle between the disc plane and the first transparent support plane (inclined angle) was 37° on the average.

(Preparation of Elliptically Polarizing Plate)

A polarizing membrane was laminated on the optically anisotropic layer and the transparent support via an adhesive layer to prepare an elliptically polarizing plate. The transmission axis of the polarizing membrane was made at right angles with the slow axis of the transparent support.

Example 7

(Preparation of Transparent Support)

A transparent support was prepared in the same manner as with cellulose ester film SE5 prepared in Example 5.

(Formation of Orientation Membrane)

An orientation membrane was formed in the same manner as with the orientation membrane in Example 1.

(Formation of Optically Anisotropic Layer)

A coating solution prepared by dissolving 41.01 g of the discotic (liquid crystalline) compound used in Example 1, 4.06 g of ethylene oxide-modified trimethylolpropane triacrylate (V#360; made by Osaka Yuki Kagaku K.K.), 0.40 g of cellulose acetate butyrate (CAB551-0.2; made by Eastman Chemical Co.), 0.23 g of cellulose acetate butyrate (CAB531-1; made by Eastman Chemical Co.), 1.35 g of a photo polymerization initiator (Irgacure 907; made by Ciba Geigy Co.), and 0.45 g of a sensitizing agent (Kayacure DETX; made by Nihon Kayaku K.K.) in 145 g of methyl ethyl ketone was coated on the orientation membrane using a #3 wire bar. This was adhesively fixed to a metal frame, heated in a 130° C. termostatic chamber for 2 minutes to thereby orient the discotic compound. Next, the discotic compound was polymerized by irradiating with UV rays at 130° C. for 1 minute using a 120 W/cm high-pressure mercury lamp, followed by being allowed to cool to room temperature. Thus, an optically anisotropic layer was formed.

The $Re_1$ retardation value of the optically anisotropic layer measured in front of the face at a wavelength of 632.8 nm was 30 nm. Also, the angle between the disc plane and the first transparent support plane (inclined angle) was 32° on the average.

(Preparation of Elliptically Polarizing Plate)

A polarizing membrane was laminated on the optically anisotropic layer and the transparent support via an adhesive layer to prepare an elliptically polarizing plate. The transmission axis of the polarizing membrane was made at right angles with the slow axis of the transparent support.

Example 8

(Preparation of Transparent Support)

A transparent support was prepared in the same manner as with cellulose ester film SE5 prepared in Example 5.

(Formation of Orientation Membrane)

An orientation membrane was formed in the same manner as with the orientation membrane in Example 1.

(Formation of Optically Anisotropic Layer)

A coating solution prepared by dissolving 41.01 g of the discotic (liquid crystalline) compound used in Example 1, 4.06 g of ethylene oxide-modified trimethylolpropane triacrylate (V#360; made by Osaka Yuki Kagaku K.K.), 0.69 g of cellulose acetate butyrate (CAB551-0.2; made by Eastman Chemical Co.), 0.23 g of cellulose acetate butyrate (CAB531.1; made by Eastman Chemical Co.), 1.35 g of a photo polymerization initiator (Irgacure 907; made by Ciba Geigy Co.), and 0.45 g of a sensitizing agent (Kayacure DETX; made by Nihon Kayaku K.K.) in 101 g of methyl ethyl ketone was coated on the orientation membrane using a #3.6 wire bar. This was adhesively fixed to a metal frame, heated in a 130° C. termostatic chamber for 2 minutes to thereby orient the discotic compound. Next, the discotic compound was polymerized by irradiating with UV rays at 130° C. for 1 minute using a 120 W/cm high-pressure mercury lamp, followed by being allowed to cool to room temperature. Thus, an optically anisotropic layer was formed.

The $Re_1$ retardation value of the optically anisotropic layer measured in front of the face at a wavelength of 632.8 nm was 45 nm. Also, the angle between the disc plane and the first transparent support plane (inclined angle) was 34° on the average.

(Preparation of Elliptically Polarizing Plate)

A polarizing membrane was laminated on the optically anisotropic layer and the transparent support via an adhesive layer to prepare an elliptically polarizing plate. The transmission axis of the polarizing membrane was made at right angles with the slow axis of the transparent support.

Comparative Example 2

(Preparation of Transparent Support)

A transparent support was prepared in the same manner as with cellulose ester film SE5 prepared in Example 5.

(Formation of Orientation Membrane)

An orientation membrane was formed in the same manner as with the orientation membrane in Example 1.

(Formation of Optically Anisotropic Layer)

A coating solution prepared by dissolving 41.01 g of the discotic (liquid crystalline) compound used in Example 1, 4.06 g of ethylene oxide-modified trimethylolpropane triacrylate (V#360; made by Osaka Yuki Kagaku K.K.), 1.35 g of a photo polymerization initiator (Irgacure 907; made by Ciba Geigy Co.), and 0.45 g of a sensitizing agent (Kayacure DETX; made by Nihon Kayaku K.K.) in 101 g of methyl ethyl ketone was coated on the orientation membrane using a #2 wire bar. This was adhesively fixed to a metal frame, heated in a 130° C. termostatic chamber for 2 minutes to thereby orient the discotic compound. Next, the discotic compound was polymerized by irradiating with UV rays at 130° C. for 1 minute using a 120 W/cm high-pressure mercury lamp, followed by being allowed to cool to room temperature. Thus, an optically anisotropic layer was formed.

The $Re_1$ retardation value of the optically anisotropic layer measured in front of the face at a wavelength of 632.8 nm was 20 nm. Also, the angle between the disc plane and the first transparent support plane (inclined angle) was 28° on the average.

(Preparation of Elliptically Polarizing Plate)

A polarizing membrane was laminated on the optically anisotropic layer and the transparent support via an adhesive layer to prepare an elliptically polarizing plate. The transmission axis of the polarizing membrane was made at right angles with the slow axis of the transparent support.

(Optical Properties of the Elliptically Polarizing Plates)

Optical properties of the elliptically polarizing plates prepared in Examples 1, 2, 3, 4, 5, 6, 7 and 8 and Comparative Examples 1 and 2 are shown in the following Table 1.

TABLE 1

| | Optically anisotropic Layer | | Transparent support | | |
|---|---|---|---|---|---|
| | Average | | | | |
| | $Re_1$ | Inclination angle | Thickness | $Re_2$ | $Rth_2$ |
| Example 1 | 38 nm | 34° | 50 μm | 20 nm | 95 nm |
| Example 2 | 38 nm | 34° | 100 μm | 44 nm | 167 nm |
| Example 3 | 38 nm | 34° | 80 μm | 35 nm | 134 nm |
| Example 4 | 38 nm | 34° | 150 μm | 55 nm | 246 nm |
| Example 5 | 38 nm | 34° | 80 μm | 31 nm | 165 nm |
| Example 6 | 38 nm | 34° | 100 μm | 40 nm | 190 nm |
| Com. Ex. 1 | 55 nm | 37° | 80 μm | 31 nm | 165 nm |
| Example 7 | 30 nm | 32° | 80 μm | 31 nm | 165 nm |
| Example 8 | 45 nm | 34° | 80 μm | 31 nm | 165 nm |
| Com. Ex. 2 | 20 nm | 28° | 80 μm | 31 nm | 165 nm |

(Notes)
$Re_1$: $Re_1$ retardation value (nm)
$Re_2$: $Re_2$ retardation value (nm)
$Rth_2$: $Rth_2$ retardation value (nm)
B: Average inclined angle (°) of the disc planes

Example 9

(Preparation of Low Temperature Polysilicon TFT)

A SiO$_2$ membrane was formed on a glass substrate according to the CVD method, and a 100-nm thick amorphous silicon membrane was formed on the SiO$_2$ membrane according to the CVD method. Subsequently, a resist was coated on the amorphous silicon membrane, followed by exposure and development according to the lithographic method to conduct patterning only at TFT channel portion, then etching the amorphous silicon membrane to a depth of 50 nm according to the dry etching method using the resist pattern as a mask. Then, the resist pattern was removed, followed by irradiating with an eximer laser to convert the amorphous silicon membrane to a polysilicon membrane. Next, a 100-nm thick SiO$_2$ membrane was formed as a gate-insulating membrane, followed by forming thereon a 400-nm thick Al layer according to the sputtering method for forming electrodes. Then, patterning of the gate electrodes was conducted on the channel portion using the lithography method and the dry etching method, followed by introducing impurities into a source drain portion according to the ion-doping method using the gate electrodes as mask. Thus, a low-temperature polysilicon TFT was prepared.

(Preparation of Bend Orientation Liquid Crystal Cell)

On the low-temperature polysilicon TFT glass substrate prepared above was provided a polyimide membrane as an orientation membrane, followed by rubbing the orientation membrane. The thus-obtained two sheets of the glass substrate were faced to each other so that the rubbing directions became parallel to each other, with the cell gap being adjusted to 6 μm. A liquid crystalline compound (ZLI1132; made by Merck Co.) of 0.1396 in Δn was injected into the cell gap to prepare a bend orientation liquid crystal cell using the low-temperature polysilicon TFT.

(Preparation of Liquid Crystal Display Device)

Two elliptically polarizing plates prepared in Example 1 were laminated so as to sandwitch the prepared bend orientation cell. The elliptically polarizing plates were disposed so that the optically anisotropic layer of each elliptically polarizing plate faced the cell substrate, and that rubbing direction of the liquid crystal cell and the rubbing direction of the optically anisotropic layer facing the cell were antiparallel to each other.

Example 10

(Preparation of Liquid Crystal Display Device)

Two elliptically polarizing plates prepared in Example 2 were laminated so as to sandwitch the bend orientation cell using the low temperature polysilicon TFT prepared in Example 9. The elliptically polarizing plates were disposed so that the optically anisotropic layer of each elliptically polarizing plate faced the cell substrate, and that rubbing direction for the liquid crystal cell and the rubbing direction for the optically anisotropic layer facing the cell were antiparallel to each other.

Example 11

(Preparation of Liquid Crystal Display Device)

Two elliptically polarizing plates prepared in Example 3 were laminated so as to sandwitch the bend orientation cell using the low-temperature polysilicon TFT prepared in Example 9. The elliptically polarizing plates were disposed so that the optically anisotropic layer of each elliptically polarizing plate faced the cell substrate, and that rubbing direction for the liquid crystal cell and the rubbing direction for the optically anisotropic layer facing the cell were antiparallel to each other.

Example 12

(Preparation of Liquid Crystal Display Device)

Two elliptically polarizing plates prepared in Example 4 were laminated so as to sandwitch the bend orientation cell using the low temperature polysilicon TFT prepared in Example 9. The elliptically polarizing plates were disposed so that the optically anisotropic layer of each elliptically polarizing plate faced the cell substrate, and that rubbing direction for the liquid crystal cell and the rubbing direction for the optically anisotropic layer facing the cell were antiparallel to each other.

Example 13

(Preparation of Liquid Crystal Display Device)

Two elliptically polarizing plates prepared in Example 5 were laminated so as to sandwitch the bend orientation cell using the low temperature polysilicon TFT prepared in Example 9. The elliptically polarizing plates were disposed so that the optically anisotropic layer of each elliptically polarizing plate faced the cell substrate, and that rubbing direction for the liquid crystal cell and the rubbing direction for the optically anisotropic layer facing the cell were antiparallel to each other.

Example 14

(Preparation of Liquid Crystal Display Device)

Two elliptically polarizing plates prepared in Example 6 were laminated so as to sandwitch the bend orientation cell using the low temperature polysilicon TFT prepared in Example 9. The elliptically polarizing plates were disposed so that the optically anisotropic layer of each elliptically polarizing plate faced the cell substrate, and that rubbing direction for the liquid crystal cell and the rubbing direction for the optically anisotropic layer facing the cell were antiparallel to each other.

Comparative Example 3

(Preparation of Liquid Crystal Display Device)

Two elliptically polarizing plates prepared in Comparative Example 1 were laminated so as to sandwitch the bend orientation cell using the low temperature polysilicon TFT prepared in Example 9. The elliptically polarizing plates were disposed so that the optically anisotropic layer of each elliptically polarizing plate faced the cell substrate, and that rubbing direction for the liquid crystal cell and the rubbing direction for the optically anisotropic layer facing the cell were antiparallel to each other.

Example 15

(Preparation of Liquid Crystal Display Device)

Two elliptically polarizing plates prepared in Example 7 were laminated so as to sandwitch the bend orientation cell using the low temperature polysilicon TFT prepared in Example 9. The elliptically polarizing plates were disposed so that the optically anisotropic layer of each elliptically polarizing plate faced the cell substrate, and that rubbing direction for the liquid crystal cell and the rubbing direction for the optically anisotropic layer facing the cell were antiparallel to each other.

Example 16

(Preparation of Liquid Crystal Display Device)

Two elliptically polarizing plates prepared in Example 8 were laminated so as to sandwich the bend orientation cell using the low temperature polysilicon TFT prepared in Example 9. The elliptically polarizing plates were disposed so that the optically anisotropic layer of each elliptically polarizing plate faced the cell substrate, and that rubbing direction for the liquid crystal cell and the rubbing direction for the optically anisotropic layer facing the cell were antiparallel to each other.

Comparative Example 4

(Preparation of Liquid Crystal Display Device)

Two elliptically polarizing plates prepared in Comparative Example 2 were laminated so as to sandwich the bend orientation cell using the low temperature polysilicon TFT prepared in Example 9. The elliptically polarizing plates were disposed so that the optically anisotropic layer of each elliptically polarizing plate faced the cell substrate, and that rubbing direction for the liquid crystal cell and the rubbing direction for the optically anisotropic layer facing the cell were antiparallel to each other.

(Evaluation of Liquid Crystal Display Devices)

A 55 Hz rectangular voltage was applied to each of the liquid crystal cells in the liquid crystal display devices prepared in Examples 9, 10, 11, 12, 13, 14, 15 and 16 and Comparative Examples 3 and 4. They were in a normally white mode, with the white display voltage being 2 V and the black display voltage being a voltage at which the transmission became minimal for each liquid crystal cell. The transmission ratio (white display/black display) was taken as a contrast ratio, and a viewing angle for obtaining a contrast ratio of 10 in each of the upper, lower, right and left viewing angles was measured.

TABLE 2

| | | Viewing angle | | | |
| --- | --- | --- | --- | --- | --- |
| | Driving Voltage | Upper Viewing Angle | Lower Viewing Angle | Left Viewing Angle | Right Viewing Angle |
| Example 9 | 4.1 V | 61° | 61° | 71° | 71° |
| Example 10 | 4.1 V | 78° | 67° | 80° | 80° |
| Example 11 | 4.1 V | 73° | 63° | 80° | 80° |
| Example 12 | 4.1 V | 75° | 64° | 78° | 78° |
| Example 13 | 4.1 V | 77° | 71° | 80° | 80° |
| Example 14 | 4.1 V | 68° | 71° | 68° | 68° |
| Com. Ex. 3 | 3.2 V | 47° | 28° | 51° | 51° |
| Example 15 | 4.5 V | 76° | 69° | 80° | 80° |
| Example 16 | 3.7 V | 73° | 68° | 80° | 80° |
| Com. Ex. 4 | 5.2 V | 42° | 22° | 53° | 53 |

Additionally, response speed in each of Examples 9 to 16 and Comparative Examples 3 and 4 was equally 10 msec.

INDUSTRIAL APPLICABILITY

According to the invention, there is obtained a liquid crystal display device which requires a reduced power consumption, which shows improved response speed and improved viewing angle properties, and which can give high-quality image display at a low power consumption.

The invention claimed is:

1. A liquid crystal display device comprising:
   a bend orientation mode liquid crystal cell using a low-temperature polysilicon TFT; and
   two polarizing plates disposed on both sides of the liquid crystal cell respectively,
   wherein at least one of the two polarizing plates is an elliptically polarizing plate comprising: a transparent protective layer; a polarizing layer; a transparent support; and an optically anisotropic layer comprising a discotic compound, in this order from outside of the liquid crystal cell,
   an inclination angle between the disc plane of the discotic compound and the transparent support plane is within a range of 30 to 35 degrees on the average, and
   the optically anisotropic layer has a $Re_1$ retardation value measured in front of the face of 25 to 50 nm.

2. The liquid crystal display device as described in claim 1, wherein the liquid crystal display device is a normally white mode liquid crystal display device, in which a voltage to be applied in black display of the liquid crystal display device is within a range of from 3.5 to 5.0 V.

3. The liquid crystal display device as described in claim 1, wherein the optically anisotropic layer, the transparent support and the polarizing layer are disposed so that the angle between the average direction of orthogonal projections of the normal lines to disc plane of the discotic compound to the transparent support plane and the in-plane slow axis of the transparent support is substantially 45°, and the in-plane slow axis of the transparent support is substantially parallel or substantially vertical to the in-plane transparent axis of the polarizing layer.

4. The liquid crystal display device as described in claim 1, wherein the transparent support has: a $Re_2$ retardation value defined by the formula (I) below of 0 to 100 nm; and a $Rth_2$ retardation value defined by the formula (II) below of 10 to 1000 nm:

$$Re_2 = (nx_2 - ny_2) \times d_2 \quad (I)$$

$$Rth_2 = [(nx_2 + ny_2)/2 - nz_2] \times d_2 \quad (II)$$

wherein $nx_2$ represents a refractive index along the slow axis in-plane of the transparent support, $ny_2$ represents a refractive index along the fast axis in-plane of the transparent support, $nz_2$ represents a refractive index in the depthwise direction of the transparent support, and $d_2$ represents a thickness of the transparent support.

5. The liquid crystal display device as described in claim 4, wherein the transparent support has the $Re_2$ retardation value defined by the formula (I) of 17 to 70 nm.

6. The liquid crystal display device as described in claim 4, wherein the transparent support has the $Rth_2$ retardation value defined by the formula (II) of 70 to 300 nm.

7. The liquid crystal display device as described in claim 1, wherein the optically anisotropic layer has the $Re_1$ retardation value measured in front of the face of 28 to 48 nm.

8. The liquid crystal display device as described in claim 1, wherein the discotic compound is oriented and fixed in the optically anisotropic layer while maintaining the compound in the oriented state.

9. The liquid crystal display device as described in claim 8, wherein the discotic compound is fixed in the optically anisotropic layer by a polymerization reaction.

10. The liquid crystal display device as described in claim 1, wherein the transparent support includes a cellulose ester film.

* * * * *